US012784717B2

(12) United States Patent
Branch

(10) Patent No.: US 12,784,717 B2
(45) Date of Patent: Nov. 3, 2026

(54) PORTABLE TIMPANI GAUGE

(71) Applicant: Sonja D. Branch, Tempe, AZ (US)

(72) Inventor: Sonja D. Branch, Tempe, AZ (US)

( * ) Notice: Subject to any disclaimer, the term of this patent is extended or adjusted under 35 U.S.C. 154(b) by 235 days.

(21) Appl. No.: 18/533,748

(22) Filed: Dec. 8, 2023

(65) Prior Publication Data

US 2024/0203381 A1 Jun. 20, 2024

Related U.S. Application Data

(60) Provisional application No. 63/387,481, filed on Dec. 14, 2022.

(51) Int. Cl.
*G10D 13/16* (2020.01)
*G10D 13/04* (2006.01)

(52) U.S. Cl.
CPC ............. *G10D 13/16* (2020.02); *G10D 13/04* (2013.01)

(58) Field of Classification Search
CPC ......... G10D 13/16; G10D 13/04; G10D 13/00
See application file for complete search history.

(56) References Cited

U.S. PATENT DOCUMENTS 4,056,998 A * 11/1977 Rampton ............... G10D 13/04 84/419
5,427,009 A * 6/1995 LaPlante ................ G10D 13/16 84/413

* cited by examiner

*Primary Examiner* — Kimberly R Lockett
(74) *Attorney, Agent, or Firm* — FULLER IP LAW LLC; Bryce W. Burnham

(57) ABSTRACT

A timpani gauge with a gauge body, drum clips, a pedal clip, and a string. The gauge body has a channel and a groove adjacent to the channel. At least one knob is positioned within and configured to slide along the channel. The drum clips are attached to the gauge body and may have a magnet configured to couple with a rim of a timpani. The pedal clip attaches to a foot pedal of the timpani. The string attaches to the pedal clip, slidingly couples with the groove of the gauge body, and attaches to a weight to suspend the weight from the gauge body. The string has an indicator adjacent to the gauge body. When the string is attached to the foot pedal through the pedal clip, the string is configured to move the indicator with respect to the gauge body when the foot pedal is raised or lowered.

19 Claims, 13 Drawing Sheets

PORTABLE TIMPANI GAUGE

CROSS REFERENCE TO RELATED APPLICATIONS

This application claims the benefit of the filing date of U.S. Provisional Patent Application 63/387,481 entitled "Musical Instrument Periphery Device" to Dr. Sonja D. Branch that was filed on Dec. 14, 2022, the disclosure of which is hereby incorporated herein by this reference.

TECHNICAL FIELD

Aspects of this document relate generally to a musical instrument periphery device, and more specifically to a portable timpani gauge.

BACKGROUND

Many percussion instruments are large, expensive, and difficult to transport. As a result, percussionists frequently do not play on sets of drums that they own or are accustomed to because they instead use the percussion that is already present in the venue where they are performing. For example, a percussionist who plays timpani may use the timpani that are already located in the venue rather than owning and/or transporting their own timpani. While the basic function of a specific instrument such as timpani is generally consistent between different timpani, each individual instrument is also different in the way that it reacts to tuning. For example, a timpani has a foot pedal that changes the pitch of the timpani. While most timpani have this foot pedal, each individual timpani reacts differently when the pedal is used.

Additionally, some percussion, including timpani, must be tuned to different pitches depending on the music being performed. Frequently, percussionists tune these drums during the performance. Some musical compositions require tuning a timpani multiple times within the same composition. This tuning must be done quietly because other music is being performed at the same time. Thus, the percussionist must lean down close to the drum to listen and move the foot pedal to the correct position for the desired pitch. Accuracy of the pitch thus is a concern because the percussionist is playing softly, may be distracted by other music being performed, and is working quickly on a drum that the percussionist is unaccustomed to. Some timpani have gauges installed as permanent fixtures on the drum. These are damaged easily and are therefore unreliable.

SUMMARY

Aspects of this document relate to a portable timpani gauge, comprising a gauge body having a channel extending along a length of the gauge body, a groove adjacent to the channel, and at least one knob positioned within and configured to slide along the channel, at least one drum clip having a magnet configured to magnetically couple with a rim of a timpani, wherein a fastener extends through a fastener aperture in the drum clip and attaches the drum clip to the gauge body, a pedal clip configured to attach to a foot pedal of the timpani, the pedal clip having a string aperture and a threaded hole each extending through the pedal clip, wherein the pedal clip has a C-shape and wherein, when the pedal clip is inserted onto the foot pedal and a clamping screw is tightened through the threaded hole, the clamping screw presses against the foot pedal and holds the pedal clip on the foot pedal, and a string having a first end, a second end opposite the first end, and an indicator on the string between the first end and the second end, wherein the first end of the string is configured to attach to the pedal clip, wherein the string is configured to slidingly couple with the groove of the gauge body, and wherein the second end of the string is configured to attach to a weight and suspend the weight from the gauge body, wherein the indicator is positioned on the string adjacent to the gauge body, wherein, when the pedal clip is attached to the foot pedal and the string is attached to the pedal clip, slidingly coupled to the groove, and attached to the weight, the string is configured to move the indicator with respect to the gauge body when the foot pedal is raised or lowered.

Particular embodiments may comprise one or more of the following features. The at least one drum clip may have an adjustable angle with respect to the gauge body. Each of the at least one knob may be magnetic and may be configured to magnetically couple with the gauge body. The gauge body may further have a slot within the channel configured to allow a user to push on the at least one knob through the slot and lift the at least one knob out of the channel.

Aspects of this document relate to a portable timpani gauge, comprising a gauge body having a channel extending along a length of the gauge body, a groove adjacent to the channel, and at least one knob positioned within and configured to slide along the channel, at least one drum clip attached to the gauge body and configured to couple with a rim of a timpani, a pedal clip configured to attach to a foot pedal of the timpani, and a string having a first end, a second end opposite the first end, and an indicator on the string between the first end and the second end, wherein the first end of the string is configured to attach to the pedal clip, wherein the string is configured to slidingly couple with the groove of the gauge body, and wherein the second end of the string is configured to attach to a weight and suspend the weight from the gauge body, wherein, when the pedal clip is attached to the foot pedal and the string is attached to the pedal clip, slidingly coupled to the groove, and attached to the weight, the string is configured to move the indicator with respect to the gauge body when the foot pedal is raised or lowered.

Particular embodiments may comprise one or more of the following features. The at least one drum clip may be configured to magnetically couple with the rim of the timpani. A fastener may extend through a fastener aperture in the drum clip and attach the drum clip to the gauge body. The pedal clip may have a threaded hole extending through the pedal clip, wherein, when the pedal clip is inserted onto the foot pedal and a clamping screw is tightened through the threaded hole, the clamping screw presses against the foot pedal and holds the pedal clip on the foot pedal. The indicator may be positioned on the string adjacent to the gauge body. The drum clip may have an adjustable angle with respect to the gauge body. Each of the at least one knob may be magnetic and may be configured to magnetically couple with the gauge body. The gauge body may further have a slot within the channel configured to allow a user to push on the at least one knob through the slot and lift the at least one knob out of the channel.

Aspects of this document relate to a portable timpani gauge, comprising a gauge body having at least one knob configured to slide along a length of the gauge body, wherein the gauge body is configured to attach to a rim of a timpani and a string having an indicator on the string, wherein the string is configured to attach to a foot pedal of a timpani and extend alongside the gauge body while under tension, wherein, when the string is attached to the foot pedal and extends alongside the gauge body, the string is configured to move the indicator with respect to the gauge body when the foot pedal is raised or lowered.

Particular embodiments may comprise one or more of the following features. The gauge body may further have a channel extending along the length of the gauge body, wherein the at least one knob is positioned within the channel and configured to slide along the channel. The portable timpani tuner may further comprise at least one drum clip attached to the gauge body, wherein the at least one drum clip is configured to magnetically couple with the rim of the timpani. The portable timpani tuner may further comprise a pedal clip configured to attach the string to the foot pedal of the timpani, wherein the pedal clip has a threaded hole extending through the pedal clip, wherein, when the pedal clip is inserted onto the foot pedal and a clamping screw is tightened through the threaded hole, the clamping screw presses against the foot pedal and holds the pedal clip on the foot pedal. The gauge body may have a groove configured to receive the string to slidingly couple the string with the gauge body. The string may be configured to attach to a weight and suspend the weight from the gauge body, wherein the weight is configured to place the string under tension. Each of the at least one knob may be magnetic and may be configured to magnetically couple with the gauge body. The gauge body may further have a slot within the channel configured to allow a user to push on the at least one knob through the slot and lift the at least one knob out of the channel.

Aspects of this document relate to a method of tuning a timpani comprising attaching a portable timpani gauge to the timpani, adjusting a foot pedal of the timpani to give the timpani a first desired pitch, moving a first knob of the portable timpani gauge to align with a first position of an indicator on a string coupled to a foot pedal of the timpani, adjusting the foot pedal of the timpani to give the timpani a second desired pitch, moving a second knob of the portable timpani gauge to align with a second position of the indicator on the string, and selectively tuning the timpani to the first desired pitch or the second desired pitch by adjusting the foot pedal to align the indicator with the first knob or the second knob, respectively.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
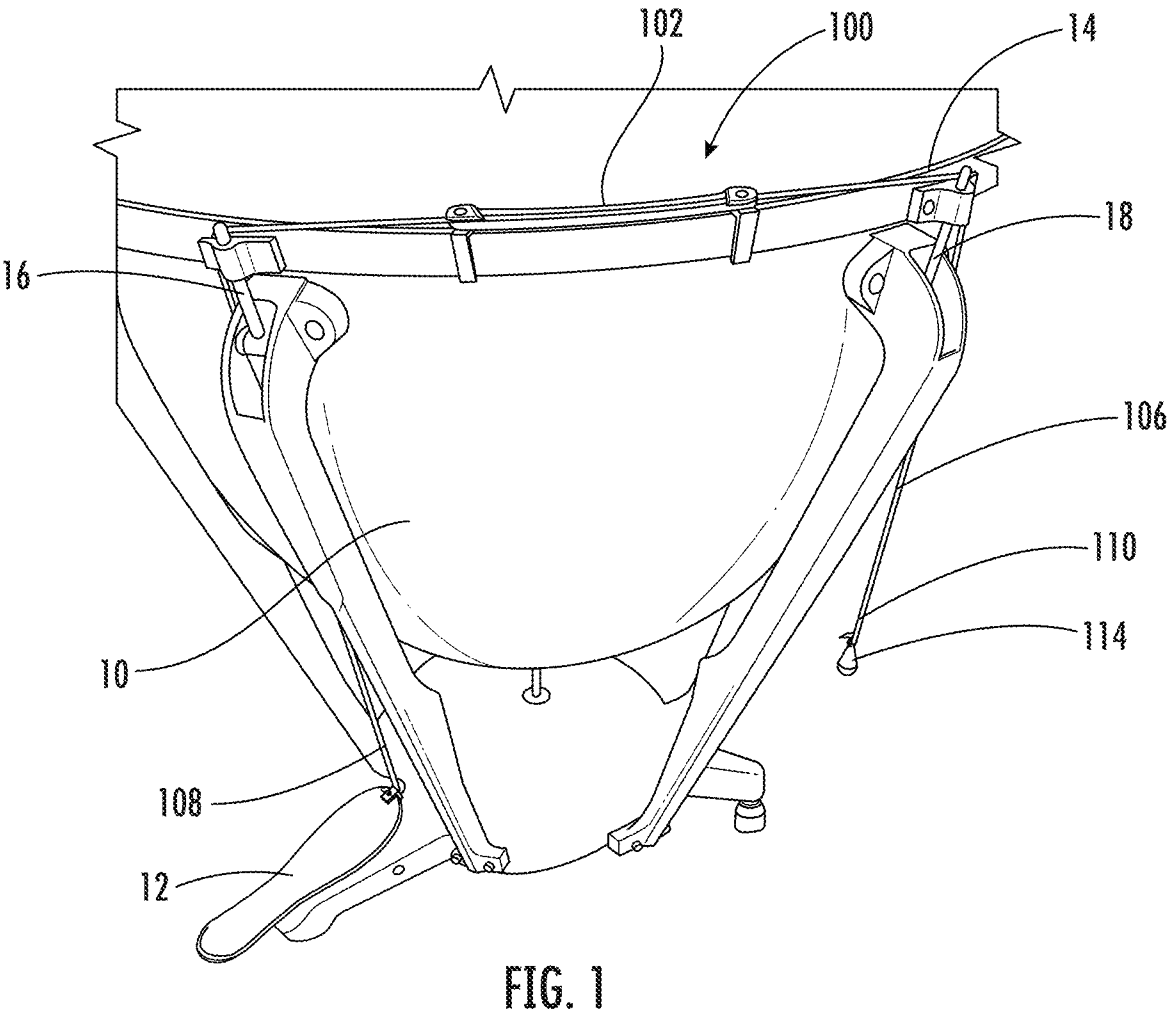
FIG. 1 is a perspective view of a portable timpani gauge installed on a timpani according to some embodiments with the foot pedal in its lowest position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Throughout the description and claims of this specification, the words “comprise” and “contain” and variations of the words, for example “comprising” and “comprises”, mean “including but not limited to”, and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term “plurality”, as used herein, means more than one. When a range of values is expressed, another embodiment includes from the one particular value and/or to the other particular value. Similarly, when values are expressed as approximations, by use of the antecedent “about,” it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a portable timpani gauge 100. The portable timpani gauge 100 is designed to allow a percussionist to tune a timpani 10 to any desired pitch prior to a performance and mark a position of the foot pedal 12 that corresponds with that pitch so that the percussionist can quickly re-tune the timpani 10 to the same pitch during the performance. This helps decrease the urgency and difficulty of tuning during the performance and improves the accuracy of the pitch. Throughout the present disclosure, the terms “gauge,” “tuner,” and “tuning gauge” are used interchangeably. Thus, in any instance when one of these terms is used, this disclosure also applies equally to the other terms.

As shown in FIGS. 1-4, the portable timpani gauge 100 is configured to attach to a side 14 of a timpani 10 between a first tension rod 16 and a second tension rod 18 of the timpani 10. The gauge 100 may comprise a gauge body 102, a drum clip 104, and a string or rope 106. The drum clip 104 is configured to attach the gauge body 102 to the timpani 10, as discussed in more detail below. The gauge body 102 may be disposed between the first tension rod 16 and the second tension rod 18 of the timpani 10. A first end 108 of the string 106 is configured to removably couple or attach to the foot pedal 12 of the timpani 10 (e.g., with a pedal clip 112, discussed in more detail below) such that the relative position between the string 106 and foot pedal 12 of the timpani 10 is fixed while coupled. In other words, when the foot pedal 12 is moved down, the first end 108 of the string 106 moves with it. The string 106 may be further configured to extend from the first end 108 at the foot pedal 12 and be disposed over the first tension rod 16 of the timpani 10, slidingly couple with the gauge body 102 (such that the string 106 can move (e.g., by sliding) relative to the gauge body 102), and/or be disposed over the second tension rod 18 of the timpani 10 to terminate at a second end 110 of the string 106 opposite the first end 108. In some embodiments, the string 106 is not coupled to the gauge body 102, but instead is configured to move adjacent to the gauge body 102 without any actual contact. In both cases, the string 106 is configured to extend alongside the gauge body 102. The string 106 may be formed of a low-stretch material. Additionally, the string 106 may be selected for additional characteristics such as the melting temperature, the diameter, whether the string 106 can be written on, the strength to support the weight 114, the ability to hold a knot, resistance to snagging and fraying, and resistance to wear. Thus, the string 106 may have different diameters, may be made from different materials, and may be formed in different ways. In some embodiments, the string 106 is formed of a polyester material. When the string 106 is coupled to the foot pedal 12, the string 106 moves in a first direction with respect to the gauge body 102 as the foot pedal 12 moves down.

Figure 14:
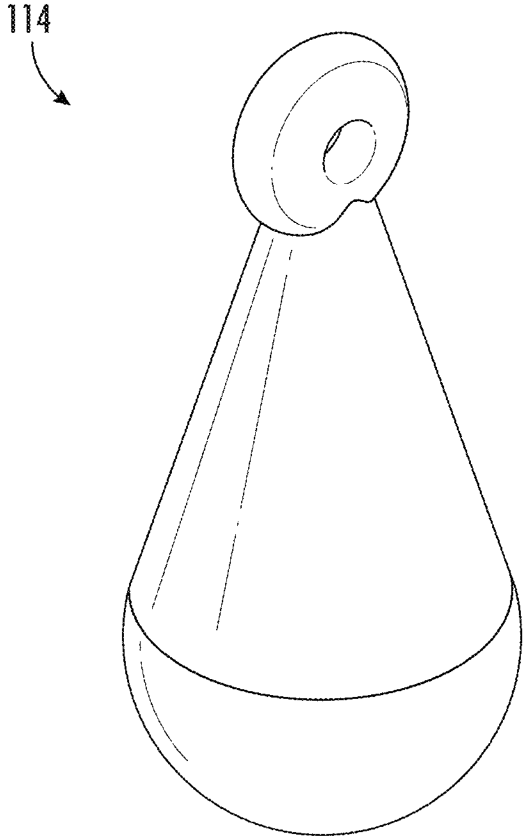
FIG. 14 is a perspective view of a weight according to some embodiments.

A weight 114 may be attached to the second end 110 of the string 106 distal to the foot pedal 12 (e.g., the end of the string 106 disposed on the other side of the first tension rod 16 and the second tension rod 18 from the foot pedal 12) to maintain tension in the string 106 and move the string 106 in a second direction opposite the first direction when the foot pedal 12 is raised. Thus, when the foot pedal 12 is lowered and raised, the string 106 moves in the first direction and the second direction, respectively, with respect to the gauge body 102. The weight 114 may be formed of any material, may have any shape, and may be any size. One embodiment of the weight 114 is shown in FIG. 14. The weight 114 may be between 2 ounces and 5 ounces. In particular embodiments, the weight 114 is 3 ounces or 4 ounces. A smaller weight 114 may be preferred to improve the portability of the gauge 100. Thus, higher density materials may also be preferred so that a higher tension in the string 106 can be maintained without requiring a large weight 114. Any method of attaching the weight 114 to the string 106 may be implemented. For example, the weight 114 may be tied to the string 106, bonded by an adhesive, or molded onto the second end 110 of the string 106. The weight 114 may include a small loop to facilitate tying the weight 114 to the string 106. The weight 114 may also be replaced by another method of maintaining tension in the string 106. For example, an extension spring may be coupled to the second end 110 of the string 106 and configured to pull on the second end 110 of the string 106 to create and maintain tension.

For purposes of this disclosure, the direction of motion of the string 106 refers to movement along the string 106. For example, when the string 106 moves in the first direction, the portion of the string 106 between the foot pedal 12 and the first tension rod 16 moves vertically downward, the portion of the string 106 between the first tension rod 16 and the second tension rod 18 moves horizontally towards the first tension rod 16, and the portion of the string 106 between the second tension rod 18 and the weight 114 moves upward. Similarly, when the string 106 moves in the second direction, the portion of the string 106 between the foot pedal 12 and the first tension rod 16 moves vertically upward, the portion of the string 106 between the first tension rod 16 and the second tension rod 18 moves horizontally towards the second tension rod 18, and the portion of the string 106 between the second tension rod 18 and the weight 114 moves downward.

The gauge body 102 is configured to sit on an edge of the timpani 10, as shown in FIGS. 1-4, and may have a slightly curved shape to imitate the curve of the timpani 10. The gauge body 102 comprises at least one knob 116 that has an adjustable position along the length of the gauge body 102, as shown in FIGS. 5-8. Frequently, the gauge body 102 comprises more than one knob 116 or a plurality of knobs 116. In some embodiments, the knob 116 sits inside of or is positioned within a channel 120 extending along a length of the gauge body 102. The depth of the channel 120 may be larger than a height of the knob 116. The channel 120 thus may help to protect the knob 116 from unintentional adjustment.

Figure 2:
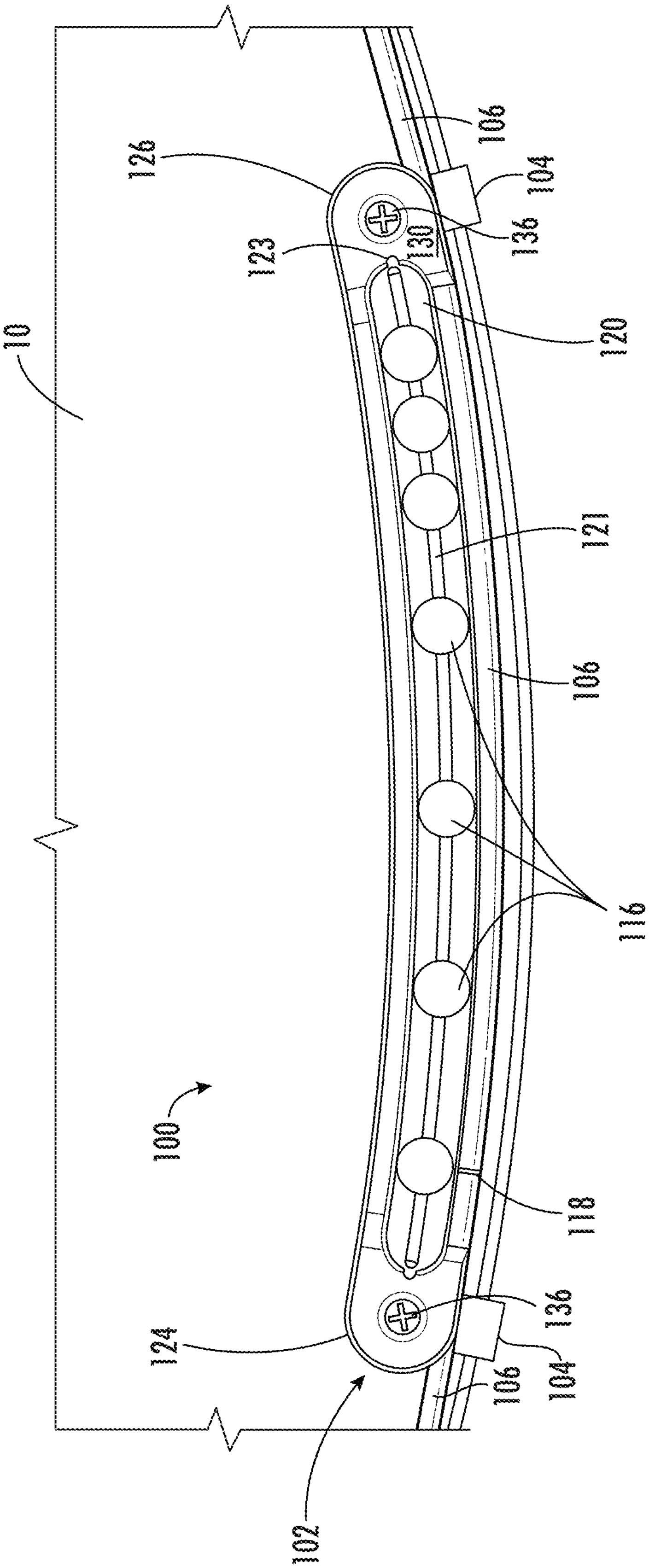
FIG. 2 is a top view of the timpani gauge installed on the timpani shown in FIG. 1 when the foot pedal is in its lowest position according to some embodiments.
Figure 3:
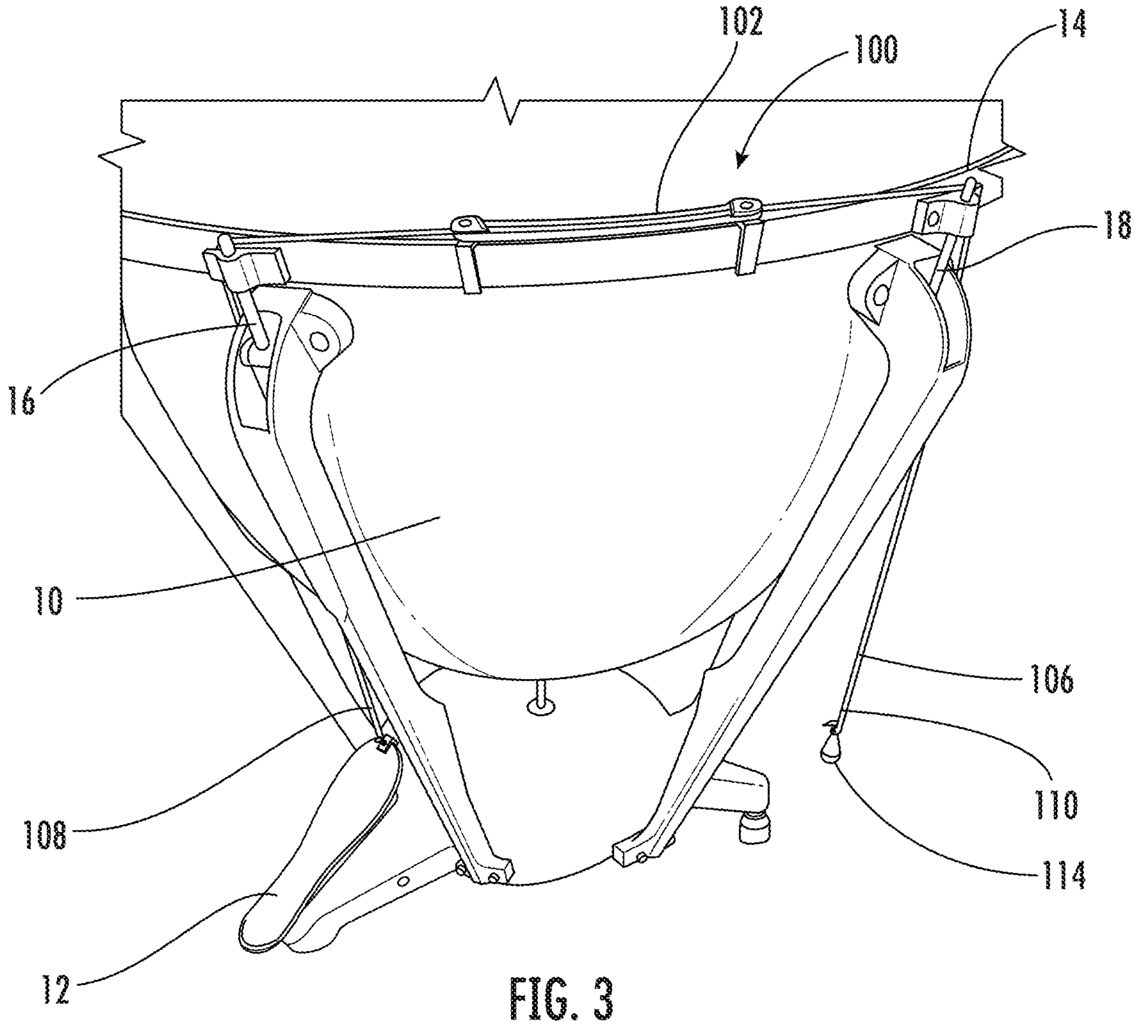
FIG. 3 is a perspective view of the timpani gauge and timpani shown in FIG. 1 according to some embodiments with the foot pedal in its highest position.
Figure 4:
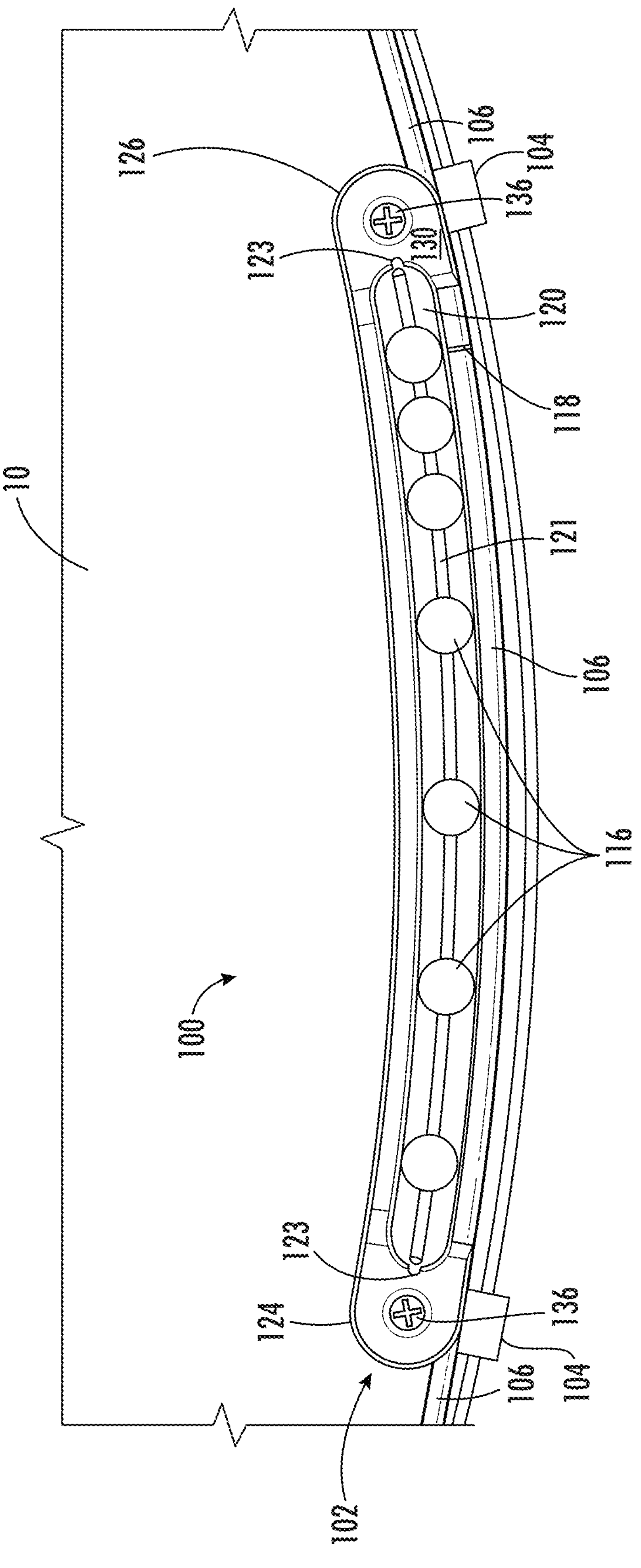
FIG. 4 is a top view of the timpani gauge installed on the timpani shown in FIG. 3 when the foot pedal is in its highest position according to some embodiments.

When the timpani 10 is tuned by raising or lowering the foot pedal 12 to a specific position, this moves the string 106 as well, as explained above. The string 106 may have an indicator 118 on the string 106 between the first end 108 and the second end 110. The indicator 118 may coincide with or be adjacent to the gauge body 102, as shown in FIGS. 2 and 4. The indicator 118 may be a marking that is only visual (e.g., a different color or pattern of the string 106), or it may be a physical component, such as a bead, knot, piece of tape, or notch. When the string 106 is attached to the foot pedal 12 and extends alongside the gauge body 102, the string 106 is configured to move the indicator 118 with respect to the gauge body 102 in response to the foot pedal 12 being raised or lowered. Thus, the indicator 118 moves along the gauge body 102 as the timpani 10 is tuned, and therefore indicates the specific position that the string 106 should be in for any particular tuning of the timpani 10. The percussionist may tune the timpani 10 before a performance and mark the position where the indicator 118 must be for the desired pitch by moving one of the knobs 116 to that position. During the performance, the percussionist can quickly tune the timpani 10 by adjusting the foot pedal 12 to the position where the indicator 118 is aligned with the knob 116.

A variety of methods of coupling the knobs 116 to the gauge body 102 are contemplated. For example, the gauge body 102 or a portion of the gauge body 102 may be formed of a ferromagnetic material and the knobs 116 may each be magnetic and/or be a magnet that is attracted to and configured to magnetically couple with the gauge body 102. The gauge body 102 may comprise a ferromagnetic base with a non-magnetic overlay forming the channel 120. The magnet may be disc-shaped. In some embodiments, the channel 120 may include a slot 121 within the channel 120. The slot 121 may extend through the gauge body 102 to expose the knobs 116 through the gauge body 102. This allows the user to push on the knobs 116 through the slot 121 and lift the knobs 116 out of the channel 120 if desired. Thus, the slot 121 facilitates removal of the knobs 116 from the channel 120 in embodiments where the knobs 116 may be difficult to remove, such as when the knobs 116 are magnetic. The channel 120 may also include an end notch 123 on either or both ends of the channel 120. The end notch 123 has a smaller curvature than the knobs 116 such that the knobs 116 cannot fit into the end notch 123. Thus, even if a knob 116 gets moved all the way to the end of the channel 120, it does not enter the end notch 123. This provides leverage on the side of the knob 116 to move the knob 116 away from the end of the channel 120 and thus prevents the knob 116 from getting stuck at the end of the channel 120.

The knobs 116 may also each have a protrusion on a bottom side of the knob 116 that extends into the gauge body 102 and holds the knob 116 to the gauge body 102 while allowing the knob 116 to slide along the channel 120 and/or along the length of the gauge body 102. Other configurations that hold the knobs 116 to the gauge body 102 while allowing the gauge body 102 to slide along the length of the gauge body 102 are also possible and contemplated. As mentioned above, the gauge 100 may have a plurality of knobs 116. Each of the knobs 116 may function in the same way as described above. Having multiple knobs 116 allows multiple pitches to be tuned for the timpani 10 prior to the performance. Then, during the performance, the percussionist can quickly and accurately switch between pitches without having to listen over the sound of the other instruments performing. Each knob 116 may be labeled to indicate which pitch the knob 116 is tuned to.

Figure 5:
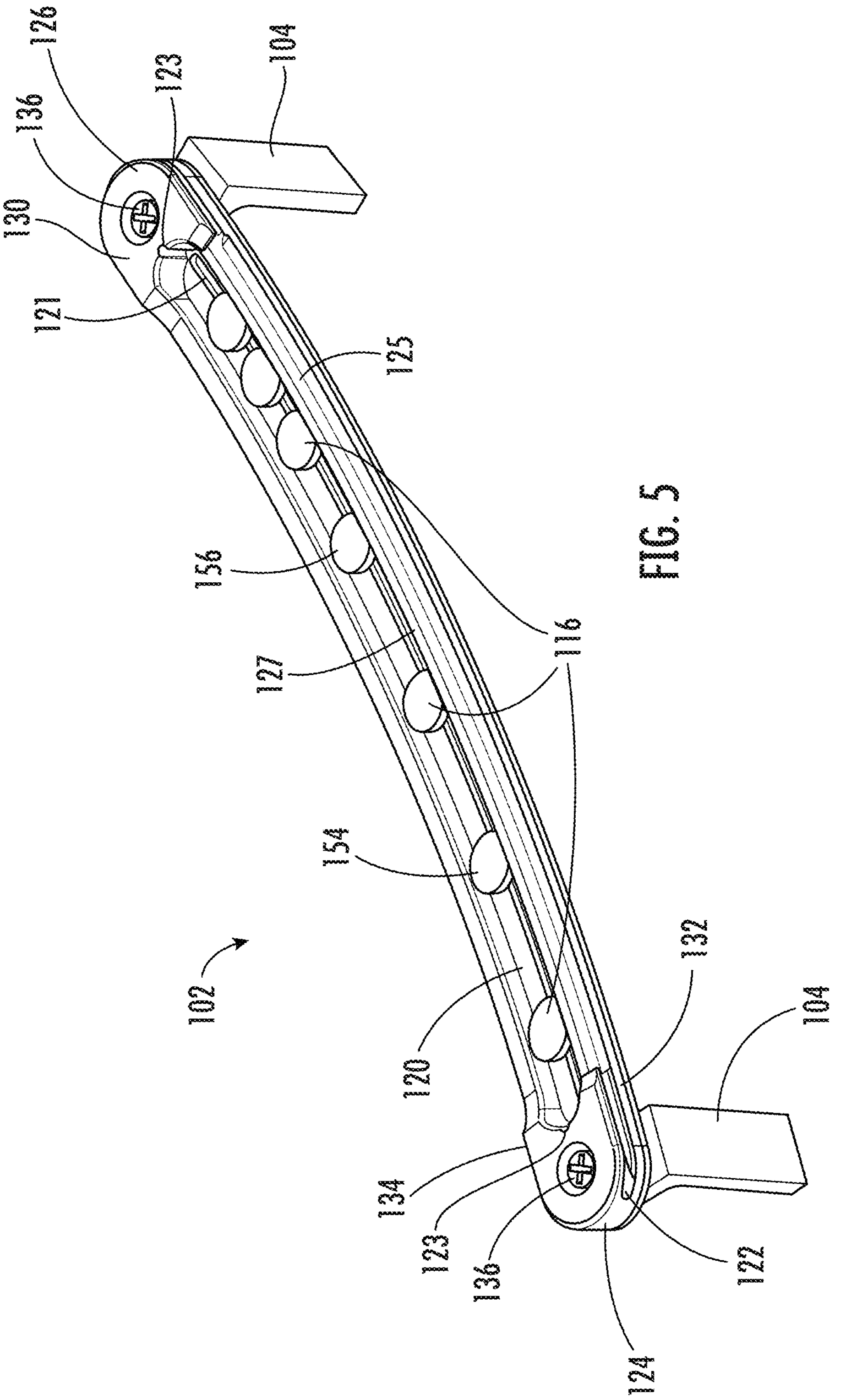
FIG. 5 is a perspective view of the gauge body of the timpani gauge shown in FIG. 1 according to some embodiments.
Figure 6:
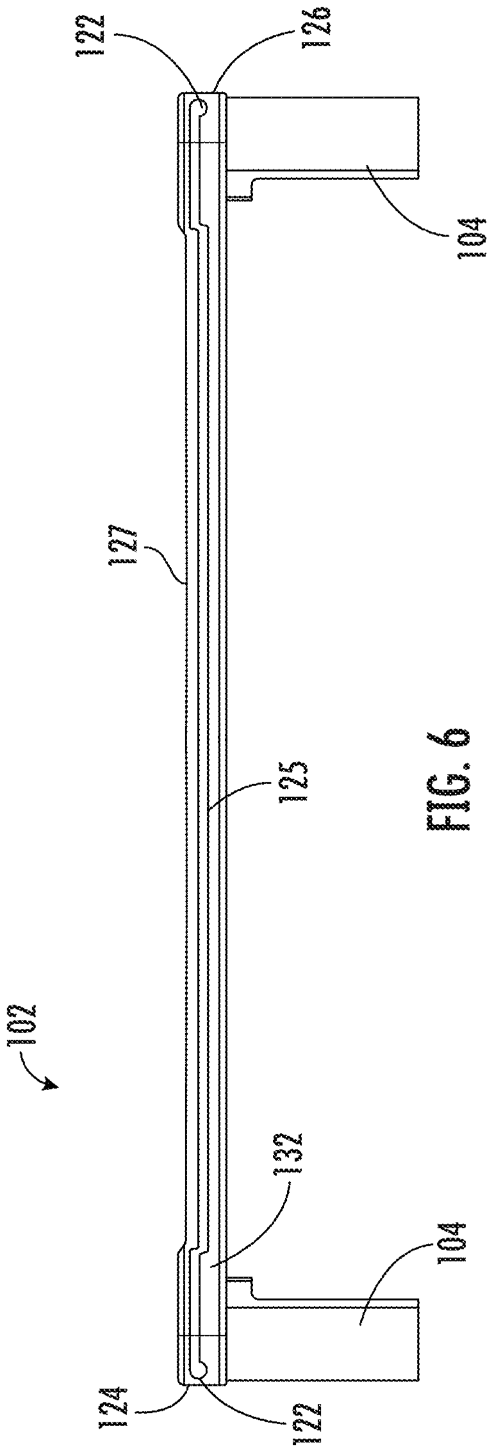
FIG. 6 is a front view of the gauge body shown in FIG. 5 according to some embodiments.
Figure 7:
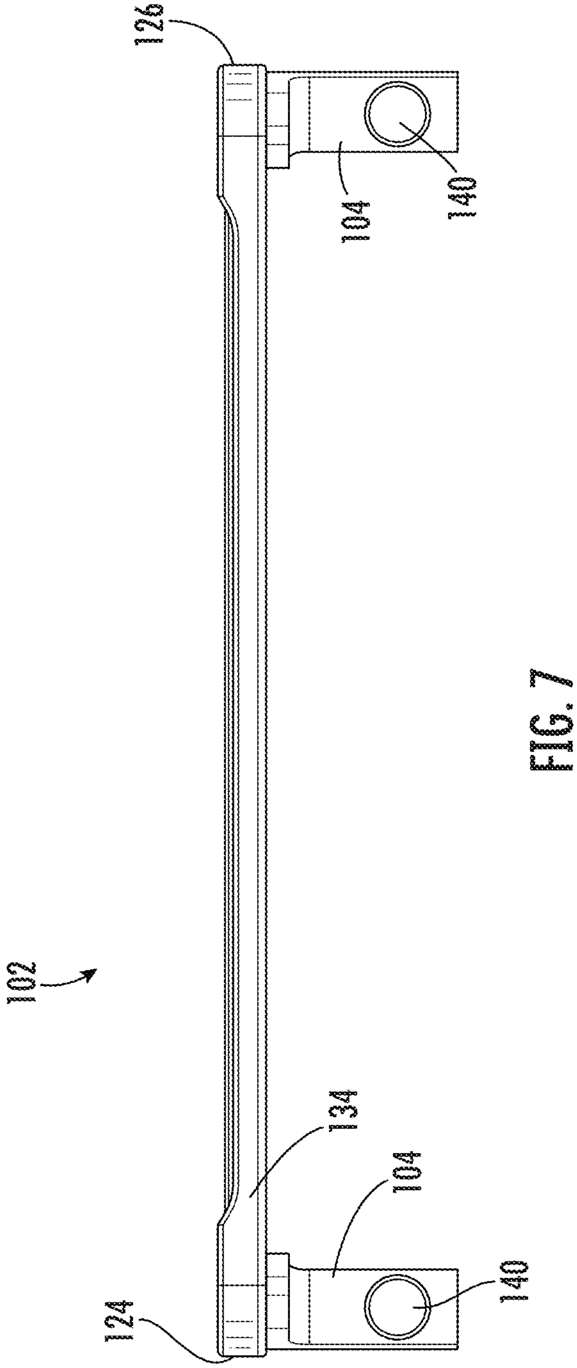
FIG. 7 is a rear view of the gauge body shown in FIG. 5 according to some embodiments.
Figure 8:
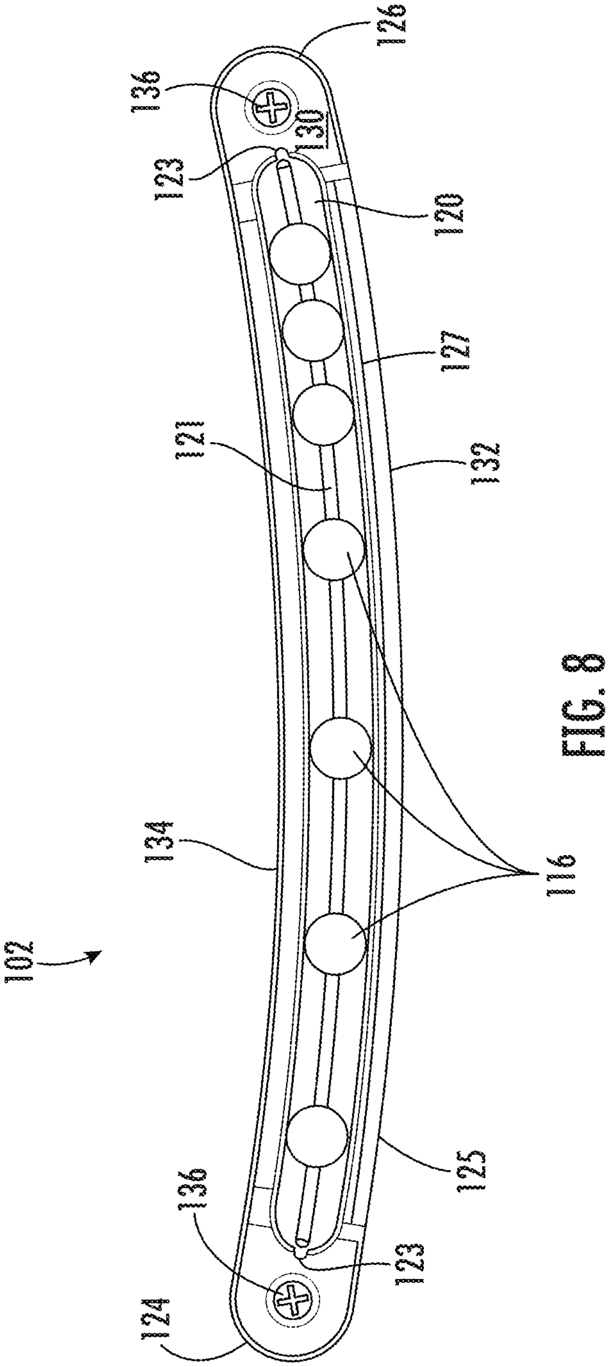
FIG. 8 is a top view of the gauge body shown in FIG. 5 according to some embodiments with the drum clips removed.
Figure 10A:
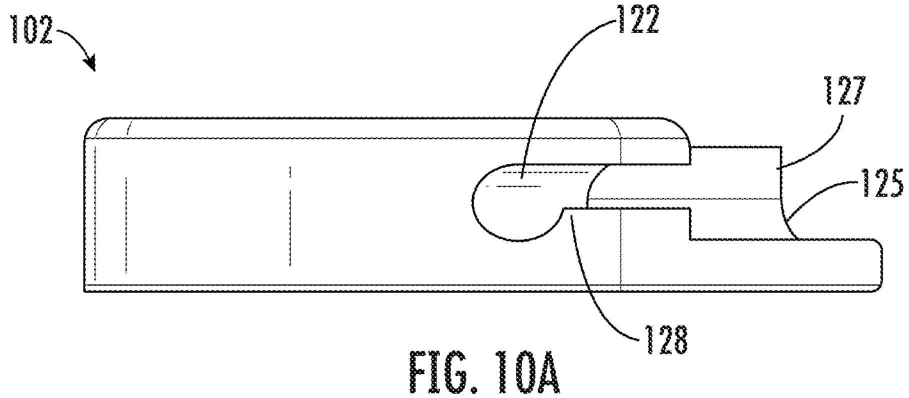
FIG. 10A is a side view of the gauge body shown in FIG. 5 with the groove on the front face of the gauge body according to some embodiments.
Figure 10B:
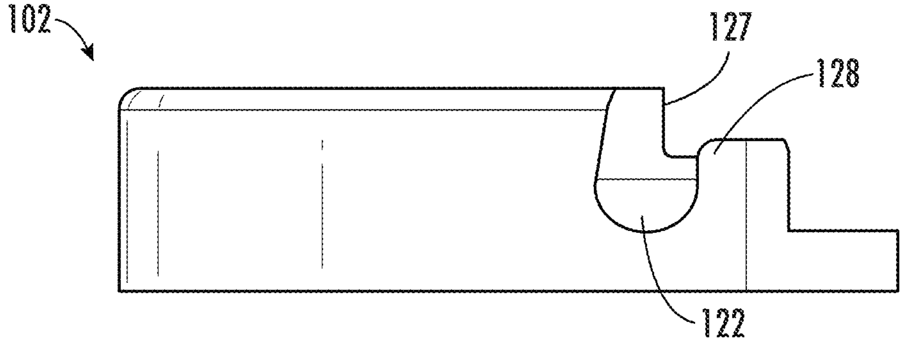
FIG. 10B is a side view of the gauge body shown in FIG. 5 with the groove on the top of the gauge body according to some embodiments.

The gauge body 102 may also have a groove 122 adjacent to the channel 120, as shown in FIGS. 5-6. The groove 122 is sized to receive the string 106 and is configured to guide the string 106 along the channel 120 to facilitate comparing the position of the indicator 118 on the string 106 with the knob 116. The groove 122 may extend along the length of the gauge body 102 or may only be positioned in specific locations on the gauge body 102, such as on the first end 124 and the second end 126 of the gauge body 102. As shown in FIGS. 10A and 10B, the groove 122 may have a lip 128 that curves slightly over the string 106 when the string 106 is placed within the groove 122 to help retain the string 106 within the groove 122. The groove 122 may be oriented in the same direction as the channel 120, with both opening towards a top 130 of the gauge body 102 (FIG. 10B). Alternatively, the groove 122 may be oriented to open on a different face of the gauge body 102, such as the front face 132 (FIG. 10A) or the back face 134. In some embodiments, the groove 122 comprises a string race 125 that follows the curvature of the gauge body 102 and has an inner wall 127 that is raised to better keep the string 106 in place.

Figure 11:
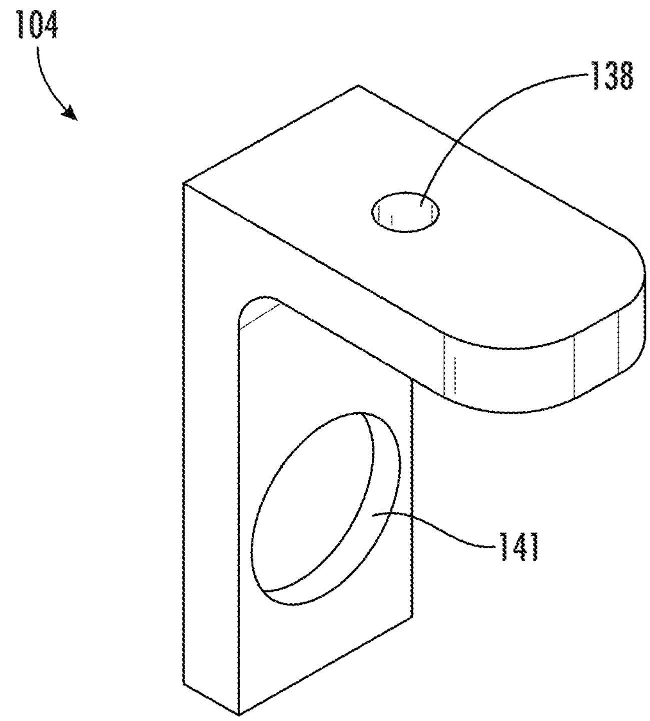
FIG. 11 is a perspective view of a drum clip according to some embodiments.

As mentioned above, the drum clip 104 is attached to the gauge body 102 and is configured to couple the gauge body 102 to the timpani 10. In some embodiments, there are two or more drum clips 104. The drum clips 104 may be positioned on each end of the gauge body 102 or in other locations that help stabilize the gauge body 102 against the timpani 10. The drum clips 104 may have an L-shape (FIG. 11) and may be attached to the gauge body 102 through a screw or other fastener 136 that extends through a fastener aperture 138 in the drum clip 104. For example, the drum clip 104 may have a fastener aperture 138 on a horizontal, upper portion of the drum clip 104, as shown in FIG. 11. In some embodiments, the drum clips 104 are integral with the gauge body 102.

The drum clips 104 are configured to attach to the timpani 10 to couple the gauge body 102 to the timpani 10. This may be done with a clip, hook, or other fastener 136. Alternatively, because most timpani 10 are formed with a ferromagnetic rim, each drum clip 104 may comprise a magnet 140 configured to magnetically couple to the rim of the timpani 10, thus holding the gauge body 102 to the timpani 10. The drum clip 104 may have a cavity 141 sized and shaped to receive the magnet 140. For example, the drum clip 104 may have a cavity 141 on a vertical, lower portion of the drum clip 104, as shown in FIG. 11. In some embodiments, the cavity 141 may be fully enclosed to maintain the magnet 140 within the drum clip 104. In some embodiments, the drum clip 104 is made of a magnetic material.

Figure 9:
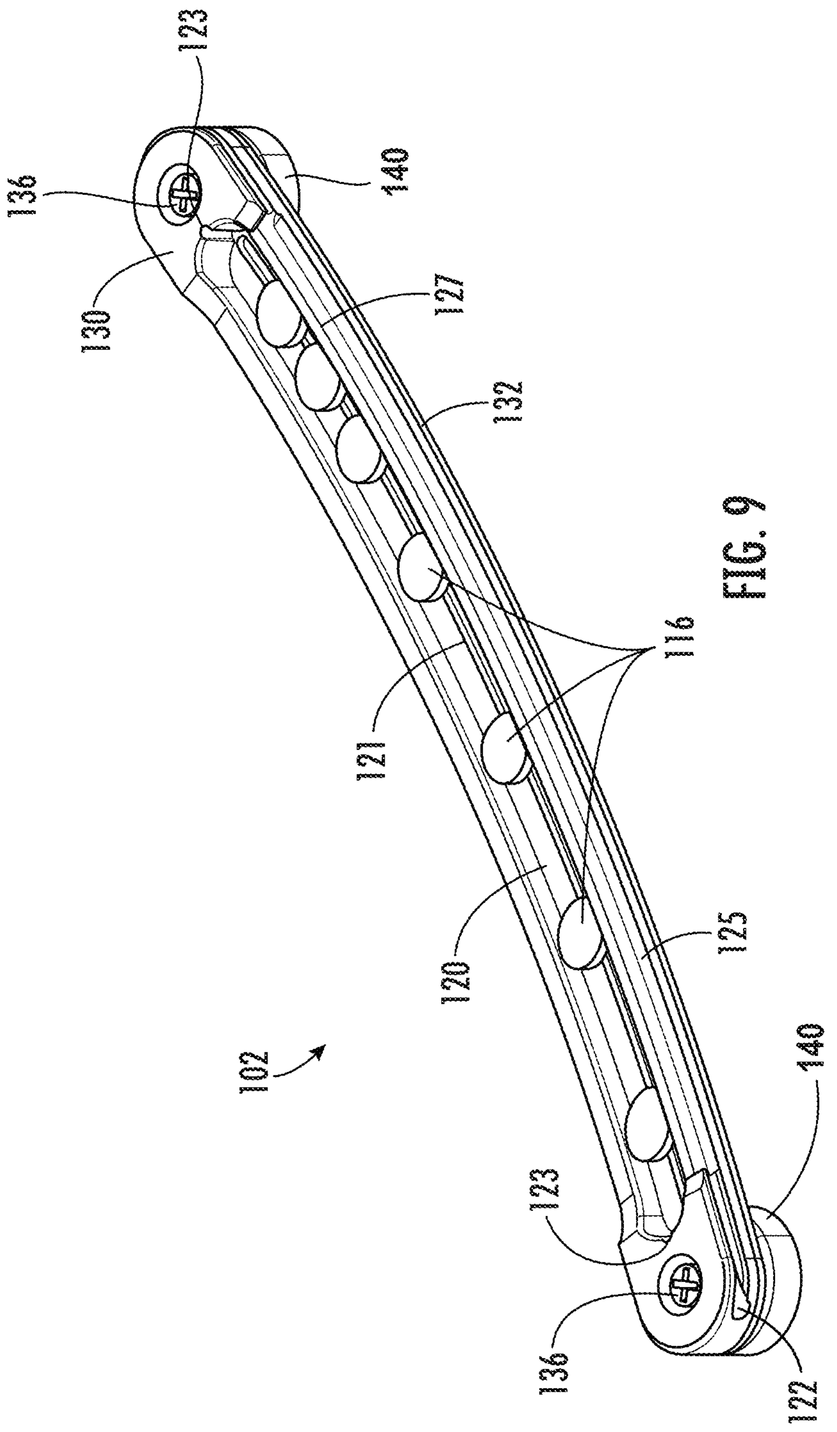
FIG. 9 is a perspective view of the gauge body of the timpani gauge shown in FIG. 1 according to some embodiments.

The drum clips 104 may have an adjustable angle with respect to the gauge body 102 and may be rotatable with respect to the gauge body 102, thus allowing the drum clips 104 to adjust to different size timpani 10. If the timpani 10 has a smaller radius, the drum clips 104 can rotate to adjust to the increased curvature of the rim. Similarly, if the timpani 10 has a larger radius, the drum clips 104 can rotate to adjust to the decreased curvature of the rim. In some embodiments, in particular those that use a fastener 136 to attach the drum clips 104 to the gauge body 102, the drum clips 104 are loosened with respect to the gauge body 102, then rotated to adjust the angle of the drum clips 104 with respect to the gauge body 102, and then tightened again. In some embodiments, the drum clips 104 are coupled to the gauge body 102 tightly enough that the drum clips 104 do not rotate unintentionally but are loose enough to be rotated by hand without requiring a tool to loosen the fasteners 136 or other components used to couple the drum clips 104 to the gauge body 102. For the embodiments that implement the magnet 140 in each drum clip 104, the gauge body 102 can thus easily be installed on a timpani 10 by simply placing the gauge body 102 in the desired position and can easily be removed by pulling on the gauge body 102. In some embodiments, the gauge 100 does not include a drum clip 104. For example, the gauge body 102 itself may comprise a magnet 140 that is configured to magnetically couple to the rim of the timpani 10 (FIG. 9).

Figure 12:
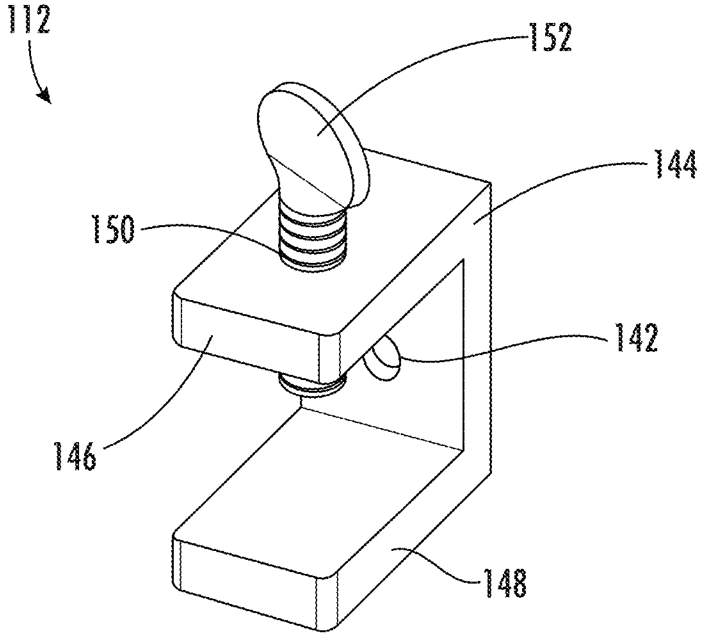
FIG. 12 is a perspective view of a pedal clip according to some embodiments.
Figure 13:
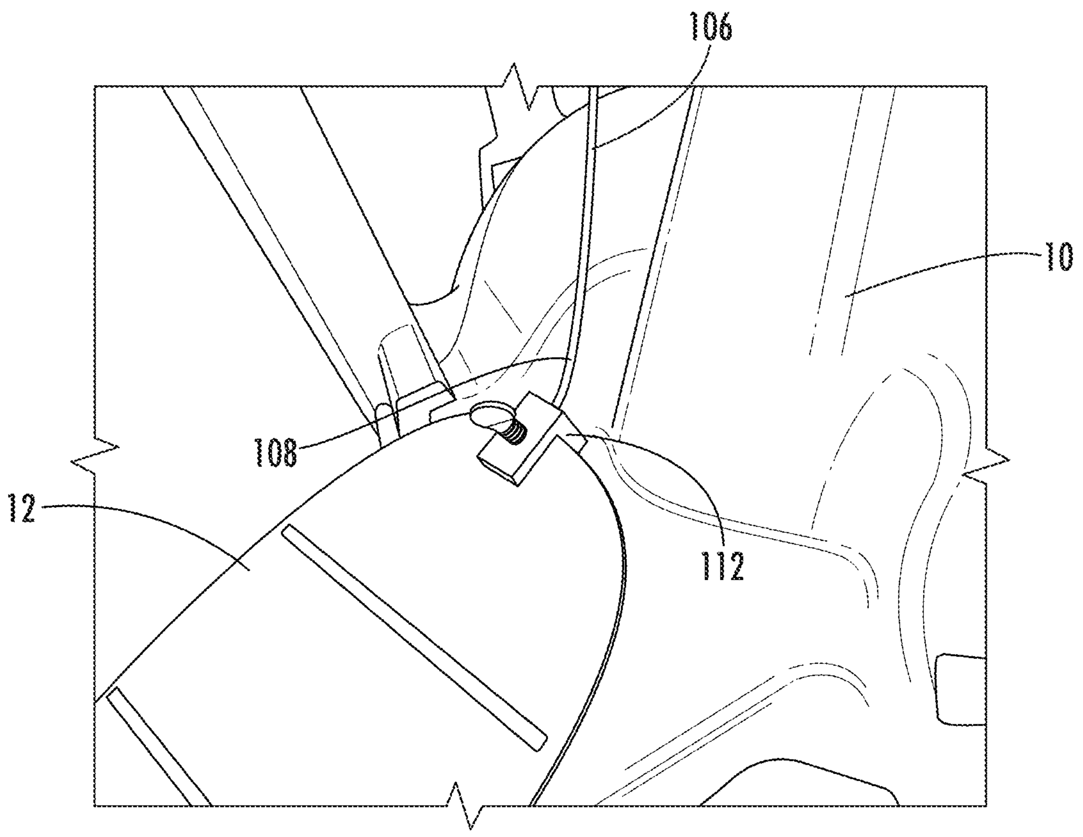
FIG. 13 is a perspective view of the pedal clip shown in FIG. 12 attached to the foot pedal of the timpani according to some embodiments.

In some embodiments, the portable timpani gauge 100 comprises a pedal clip 112, as shown in FIGS. 12 and 13. The pedal clip 112 is configured to attach to the first end 108 of the string 106 and to the foot pedal 12, and thus couple the string 106 to the foot pedal 12. Any method of attaching the pedal clip 112 to the foot pedal 12 and the string 106 to the pedal clip 112 may be used. In particular embodiments of the pedal clip 112, the pedal clip 112 has a string aperture 142 on the pedal clip 112. The string 106 may be threaded through the string aperture 142 and knotted to prevent the string 106 from exiting the string aperture 142. In some embodiments, the string 106 may be looped around and tied to itself. In some embodiments, another component, such as a bead, may be attached to the string 106 to prevent the string 106 from unthreading. In some embodiments, the string 106 is attached to the pedal clip 112 using an adhesive. In some embodiments, the string 106 is embedded within the pedal clip 112 (e.g., the pedal clip 112 may be molded around the string 106). Thus, the pedal clip 112 may be made without a string aperture 142 in some embodiments.

The pedal clip 112 may have a C-shaped portion 144 that is sized to receive the tip of the foot pedal 12 so that an upper lip 146 extends over the top surface of the foot pedal 12 and a lower lip 148 extends under the bottom surface of the foot pedal 12, as shown in FIGS. 12 and 13. The upper lip 146 may have a threaded hole 150. To attach the pedal clip 112 to the foot pedal 12, the foot pedal 12 can be inserted on the tip of the foot pedal 12 and a clamping screw 152 can be threaded into the threaded hole 150 until the clamping screw 152 presses against the foot pedal 12 with sufficient force to hold the pedal clip 112 onto the foot pedal 12.

As mentioned above, the portable timpani gauge 100 allows a percussionist to tune a timpani 10 to multiple desired pitches using the foot pedal 12 before a performance and mark where the foot pedal 12 needs to be to produce each desired pitch. During the performance, the percussionist can then use the portable timpani gauge 100 to quickly tune the timpani 10 to a new pitch as needed. This decreases the urgency and difficulty of tuning during the performance and improves the accuracy of the pitch. Moreover, because the pedal clip 112 is removably coupled to the foot pedal 12, and the gauge body 102 is removably coupled to the timpani 10, the gauge 100 is portable such that the user can bring the gauge 100 to wherever a performance or practice is taking place and use the gauge 100 for any timpani 10 that the user will play.

The present disclosure is also related to a method of tuning a timpani. Such a method may comprise attaching a timpani gauge 100 to the timpani 10, adjusting the foot pedal 12 of the timpani 10 to give the timpani 10 a first desired pitch, and moving a first knob 154 of the timpani gauge 100 to align with a first position of the indicator 118 on the string 106. The method may also comprise adjusting the foot pedal 12 of the timpani 10 to give the timpani a second desired pitch and moving a second knob 156 of the timpani gauge 100 to align with a second position of the indicator 118 on the string 106. The first knob 154 and the second knob 156 may each be a knob 116, and thus may have any of the characteristics of the knobs 116 discussed above. After the knobs 116 have been positioned, the timpani 10 can then be selectively tuned to the first desired pitch or the second desired pitch by adjusting the foot pedal 12 to align the indicator 118 with the first knob 154 or the second knob 156, respectively. Additional knobs 116 may also be placed to indicate additional pitches for the timpani 10.

It will be understood that implementations of a portable timpani gauge are not limited to the specific assemblies, devices and components disclosed in this document, as virtually any assemblies, devices and components consistent with the intended operation of a portable timpani gauge may be used. Accordingly, for example, although particular portable timpani gauges, and other assemblies, devices and components are disclosed, such may include any shape, size, style, type, model, version, class, measurement, concentration, material, weight, quantity, and/or the like consistent with the intended operation of portable timpani gauges. Implementations are not limited to uses of any specific assemblies, devices and components; provided that the assemblies, devices and components selected are consistent with the intended operation of a portable timpani gauge.

Accordingly, the components defining any portable timpani gauge may be formed of any of many different types of materials or combinations thereof that can readily be formed into shaped objects provided that the materials selected are consistent with the intended operation of a portable timpani gauge. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various portable timpani gauges may be manufactured using conventional procedures as added to and improved upon through the procedures described here. Some components defining a portable timpani gauge may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling portable timpani gauges are not limited to the specific order of steps as disclosed in this document. Any steps or sequence of steps of the assembly of a portable timpani gauge indicated herein are given as examples of possible steps or sequence of steps and not as limitations, since various assembly processes and sequences of steps may be used to assemble portable timpani gauges.

The implementations of a portable timpani gauge described are by way of example or explanation and not by way of limitation. Rather, any description relating to the foregoing is for the exemplary purposes of this disclosure, and implementations may also be used with similar results for a variety of other applications employing a portable timpani gauge.

What is claimed is:

1. A portable timpani gauge comprising:

a gauge body having a channel extending along a length of the gauge body, a groove adjacent to the channel, and at least one knob positioned within and configured to slide along the channel;

at least one drum clip having a magnet configured to magnetically couple with a rim of a timpani, wherein a fastener extends through a fastener aperture in the drum clip and attaches the drum clip to the gauge body;

a pedal clip configured to attach to a foot pedal of the timpani, the pedal clip having a string aperture and a threaded hole each extending through the pedal clip, wherein the pedal clip has a C-shape and wherein, when the pedal clip is inserted onto the foot pedal and a clamping screw is tightened through the threaded hole, the clamping screw presses against the foot pedal and holds the pedal clip on the foot pedal; and a string having a first end, a second end opposite the first end, and an indicator on the string between the first end and the second end, wherein the first end of the string is configured to attach to the pedal clip, wherein the string is configured to slidingly couple with the groove of the gauge body, and wherein the second end of the string is configured to attach to a weight and suspend the weight from the gauge body, wherein the indicator is positioned on the string adjacent to the gauge body;

wherein, when the pedal clip is attached to the foot pedal and the string is attached to the pedal clip, slidingly coupled to the groove, and attached to the weight, the string is configured to move the indicator with respect to the gauge body when the foot pedal is raised or lowered.

2. The portable timpani gauge of claim 1, wherein the at least one drum clip has an adjustable angle with respect to the gauge body.

3. The portable timpani gauge of claim 1, wherein each of the at least one knob is magnetic and is configured to magnetically couple with the gauge body.

4. The portable timpani gauge of claim 3, the gauge body further having a slot within the channel configured to allow a user to push on the at least one knob through the slot and lift the at least one knob out of the channel.

5. A portable timpani gauge comprising:

a gauge body having a channel extending along a length of the gauge body, a groove adjacent to the channel, and at least one knob positioned within and configured to slide along the channel;

at least one drum clip attached to the gauge body and configured to couple with a rim of a timpani;

a pedal clip configured to attach to a foot pedal of the timpani; and a string having a first end, a second end opposite the first end, and an indicator on the string between the first end and the second end, wherein the first end of the string is configured to attach to the pedal clip, wherein the string is configured to slidingly couple with the groove of the gauge body, and wherein the second end of the string is configured to attach to a weight and suspend the weight from the gauge body;

wherein, when the pedal clip is attached to the foot pedal and the string is attached to the pedal clip, slidingly coupled to the groove, and attached to the weight, the string is configured to move the indicator with respect to the gauge body when the foot pedal is raised or lowered.

6. The portable timpani gauge of claim 5, wherein the at least one drum clip is configured to magnetically couple with the rim of the timpani.

7. The portable timpani gauge of claim 5, wherein a fastener extends through a fastener aperture in the drum clip and attaches the drum clip to the gauge body.

8. The portable timpani gauge of claim 5, wherein the pedal clip has a threaded hole extending through the pedal clip, wherein, when the pedal clip is inserted onto the foot pedal and a clamping screw is tightened through the threaded hole, the clamping screw presses against the foot pedal and holds the pedal clip on the foot pedal.

9. The portable timpani gauge of claim 5, wherein the indicator is positioned on the string adjacent to the gauge body.

10. The portable timpani gauge of claim 5, wherein the drum clip has an adjustable angle with respect to the gauge body.

11. The portable timpani gauge of claim 5, wherein each of the at least one knob is magnetic and is configured to magnetically couple with the gauge body.

12. The portable timpani gauge of claim 11, the gauge body further having a slot within the channel configured to allow a user to push on the at least one knob through the slot and lift the at least one knob out of the channel.

13. A portable timpani gauge comprising:

a gauge body having at least one knob configured to slide along a length of the gauge body;

at least one drum clip attached to the gauge body, wherein the at least one drum clip is configured to magnetically couple with a rim of a timpani; and a string having an indicator on the string, wherein the string is configured to attach to a foot pedal of a timpani and extend alongside the gauge body while under tension;

wherein, when the string is attached to the foot pedal and extends alongside the gauge body, the string is configured to move the indicator with respect to the gauge body when the foot pedal is raised or lowered.

14. The portable timpani gauge of claim 13, the gauge body further having a channel extending along the length of the gauge body, wherein the at least one knob is positioned within the channel and configured to slide along the channel.

15. The portable timpani gauge of claim 13, further comprising a pedal clip configured to attach the string to the foot pedal of the timpani, wherein the pedal clip has a threaded hole extending through the pedal clip, wherein, when the pedal clip is inserted onto the foot pedal and a clamping screw is tightened through the threaded hole, the clamping screw presses against the foot pedal and holds the pedal clip on the foot pedal.

16. The portable timpani gauge of claim 13, wherein the gauge body has a groove configured to receive the string to slidingly couple the string with the gauge body.

17. The portable timpani gauge of claim 13, wherein the string is configured to attach to a weight and suspend the weight from the gauge body, wherein the weight is configured to place the string under tension.

18. The portable timpani gauge of claim 13, wherein each of the at least one knob is magnetic and is configured to magnetically couple with the gauge body.

19. The portable timpani gauge of claim 18, the gauge body further having a slot within the channel configured to allow a user to push on the at least one knob through the slot and lift the at least one knob out of the channel.

* * * * *